Aug. 3, 1954     I. RABINOWITZ     2,685,394
BONELESS HAM PRESSURE PACKER

Filed March 15, 1952     4 Sheets-Sheet 1

INVENTOR.
Irving Rabinowitz
BY
Harry Langsam
Attorney

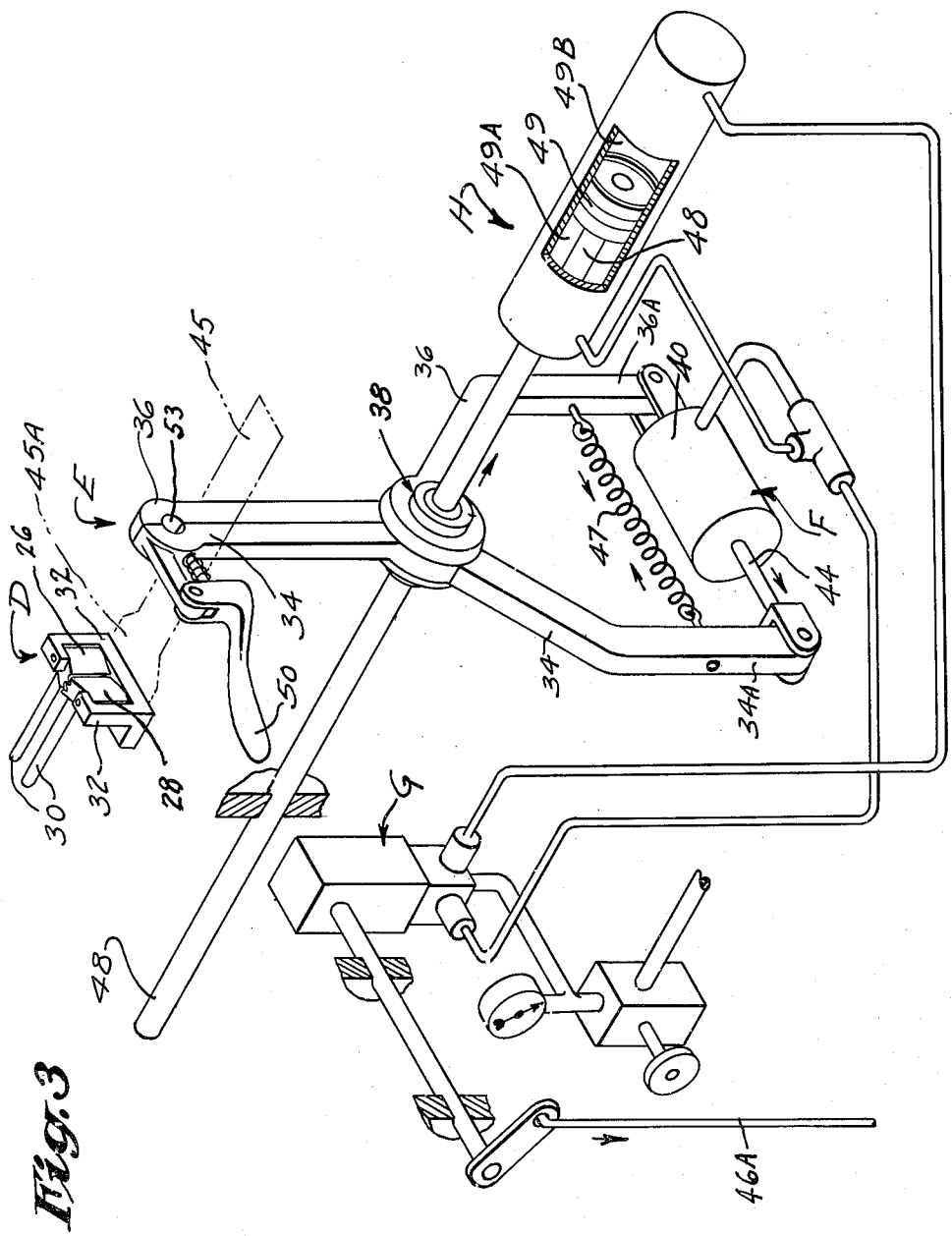

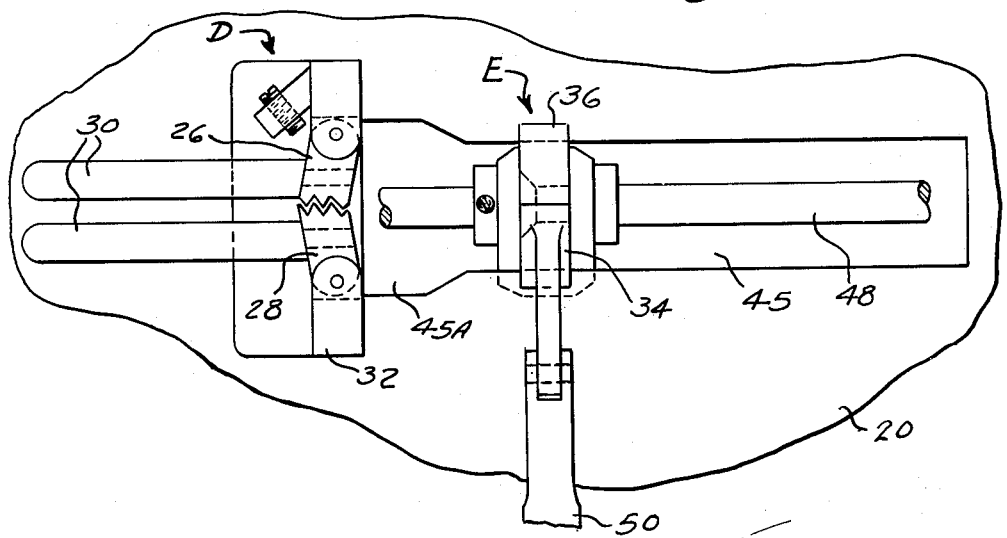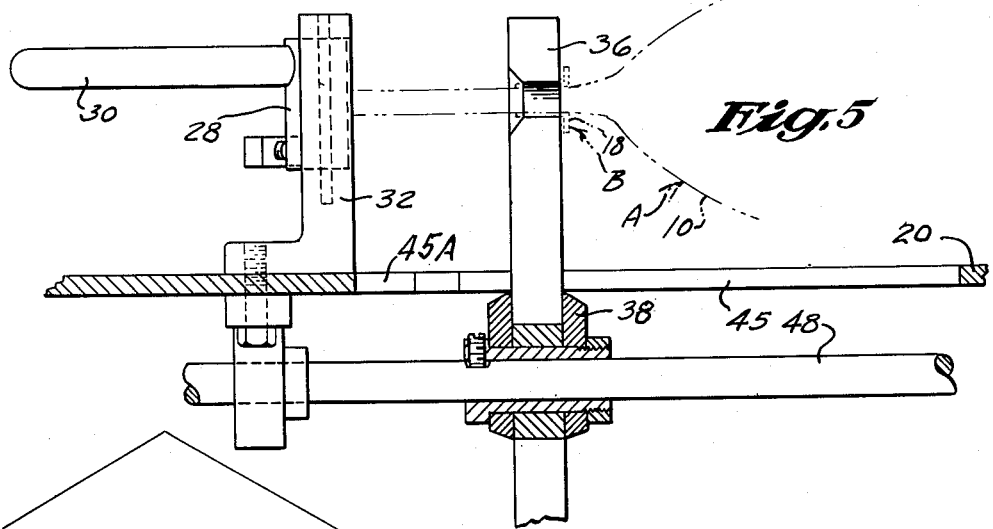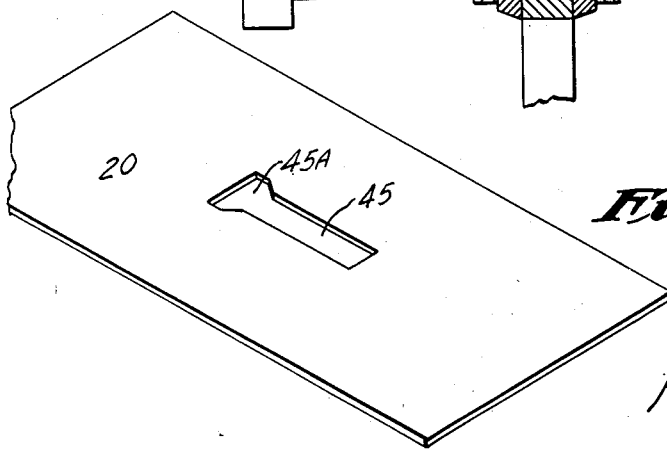

Aug. 3, 1954  I. RABINOWITZ  2,685,394
BONELESS HAM PRESSURE PACKER
Filed March 15, 1952  4 Sheets-Sheet 4
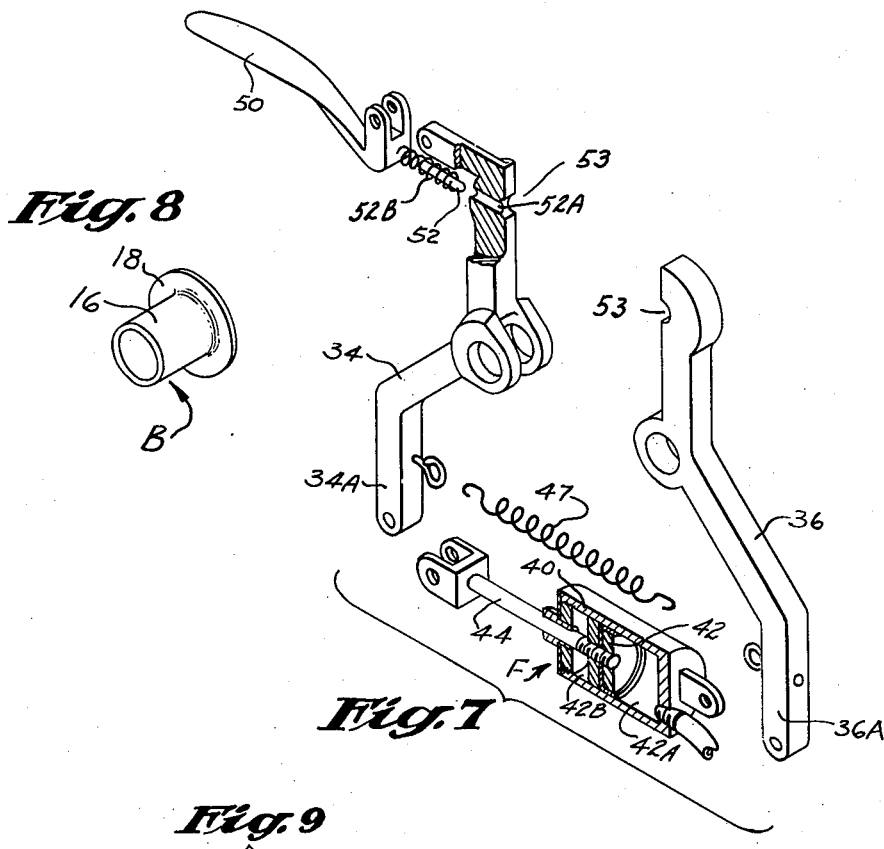
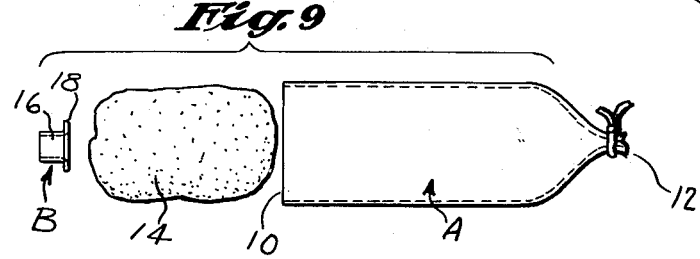
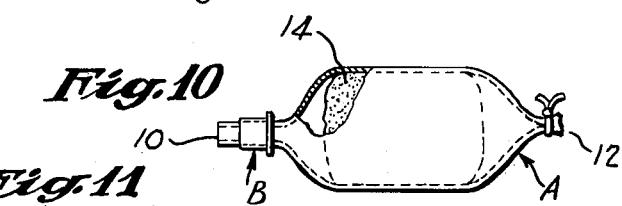
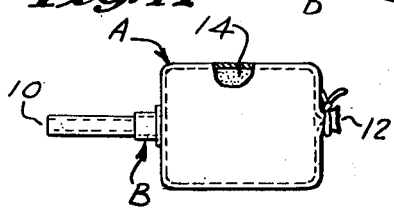
INVENTOR.
Irving Rabinowitz
BY Harry Langsam
Attorney Patented Aug. 3, 1954

2,685,394

UNITED STATES PATENT OFFICE 2,685,394

BONELESS HAM PRESSURE PACKER

Irving Rabinowitz, Philadelphia, Pa., assignor to Irving Machinery Co., Inc., Philadelphia, Pa., a corporation of Pennsylvania Application March 15, 1952, Serial No. 276,847

3 Claims. (Cl. 226—56)

My invention relates to meat packing or packaging and relates particularly to holding a boneless ham and boneless picnic in a transparent fibrous casing.

The removal of the ham bone enables the edible meat to be easily packaged with the resultant saving in storage and shipping costs. When boneless hams are packed by hand they are not held sufficiently firm to create a thoroughly solid product, since the energy required cannot produce a uniform finished product.

A boneless smoked ham is made by removing the bones and surplus fat from a cured or pickled ham. The meat is placed in a casing and bound before it is smoked. The task of rolling and binding a boneless ham heretofore involved considerable time and labor which necessarily kept their costs relatively high.

It, therefore, is an object of my invention to expedite the packaging of boneless hams.

Another object of my invention is to provide a rapid machine for binding a boneless ham.

Another object of my invention is to provide a machine wherein a boneless ham may be compactly and rapidly bound under high pressure as a roll.

Another object of my invention is to provide a machine for holding one end of a ham casing and for moving its contents to the other end, during the packaging process.

Another object of my invention is to provide an apparatus for packaging edible meats uniformly.

Another object of my invention is to provide a machine for holding the open end of an artificial casing for retaining edible meat and for pushing the edible meat towards the closed end of said casing.

Another object of my invention is to provide a machine for holding the open end of an artificial casing for retaining edible meat and for moving a ferrule over said casing whereby the contents within said casing may be firmly compressed toward the closed end of the casing and for sealing the ferrule about said casing.

Other objects of my invention are to provide an improved device of the character described, that is easily and economically produced, which is sturdy in construction, and which is highly effective in operation.

With the above and related objects in view, my invention consists in the details of construction and combination of parts as will be more fully understood from the following description, when read in conjunction with the accompanying drawing, in which:

Fig. 3 is a perspective view of the mechanism whereby the pressure packer is actuated.

Fig. 4 is a fragmentary plan view of the top of the machine.

Fig. 5 is a side view of the casing holder and ferrule pusher shown in Fig. 4.

Fig. 6 is a perspective view of the top plate alone.

Fig. 7 is a perspective view of the ferrule pusher and ferrule compressor.

Fig. 8 is a perspective view of the ferrule itself.

Fig. 9 is a side view of the casing, meat, and a ferrule for the casing.

Fig. 10 is a side view of the meat in the casing and the ferrule in one end of the casing.

Fig. 11 shows the meat in the casing as the result of the pressure packer moving the ferrule.

Fig. 12 is a view showing the meat completely compressed within the casing and the ferrule permanently compressed.

Referring now in detail to the drawings, wherein similar reference characters refer to similar parts, I show a casing, generally designated as A, such as cotton cellulose casing or fibrous casing wherein edible meats or a boneless ham or boneless picnic is held.

Figure 1:
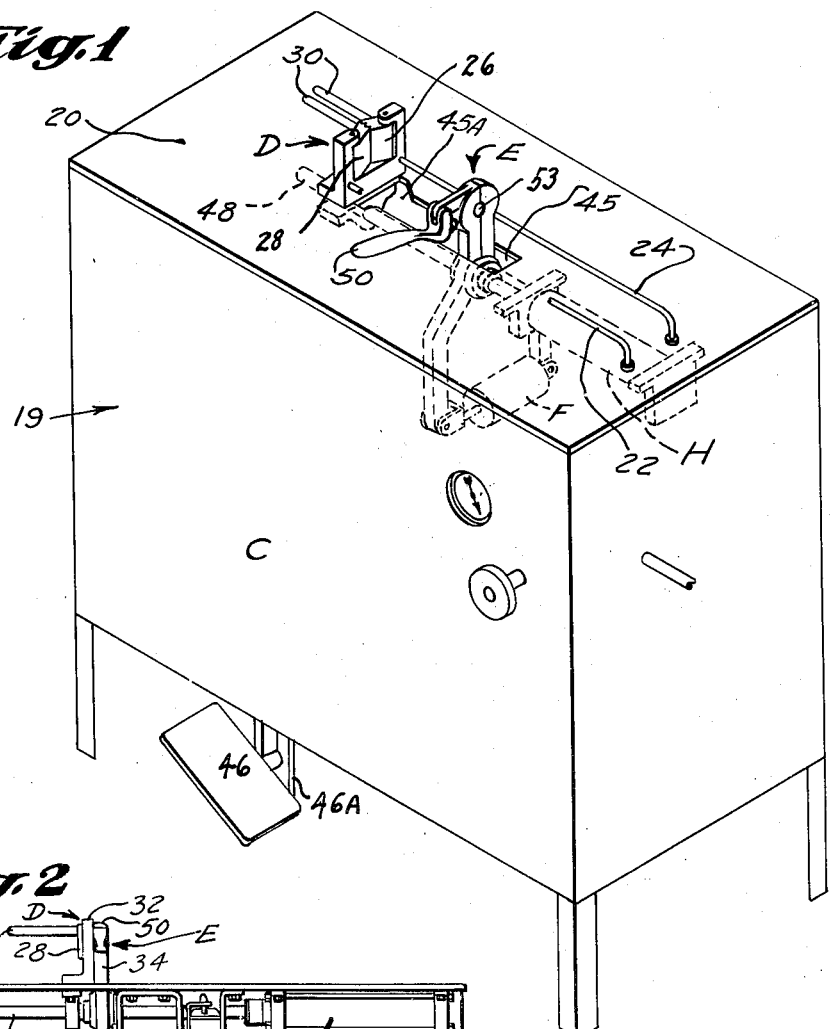
Fig. 1 is a perspective view of a machine embodying my invention for packaging or rolling a ham.
Figure 2:
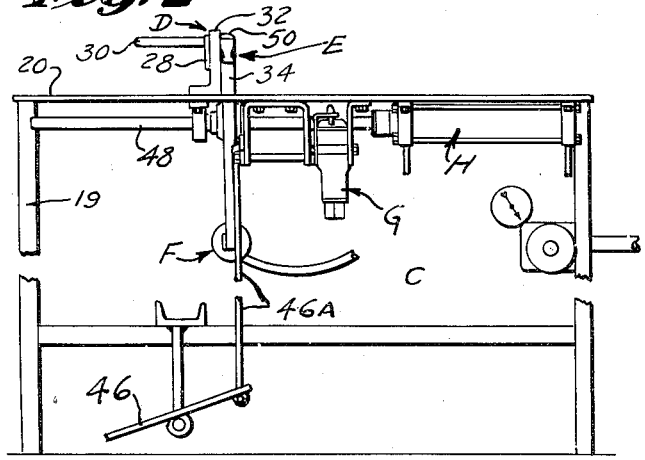
Fig. 2 is a side view of the machine shown in Fig. 1.

The casing A is open at both ends 10, 12.

The boneless ham has had the curing solution or the pickle injected into the ham through the arteries. Afterwards, the ham is held in the same kind of solution to complete cure.

The pickled ham or edible meat 14 is inserted within the casing A and one end 12 thereof is bound by cord. The other end 10 of the casing remains open and a metallic ferrule or metallic casing closure, generally designated as B, having a narrow cylindrical portion 16 with a flange 18 projecting at right angles to one end of the cylindrical portion 16 is slipped over the open end of the casing so that the casing is pervated through the closure opening.

A machine, generally designated as C, operates to hold the open end of the casing and to move or shift the ham 14 under pressure within the casing A while another portion clamps the ferrule to the casing. These parts and their function hereinafter will be described in greater detail.

The machine C comprises a frame 19 having a top 20. The top of the machine carries a pair of spaced rods 22, 24 on which the ham in the casing is supported. A casing holder clamp, generally designated as D, has a pair of serrated jaws 26, 28 which are mounted upon vertically extending pivots and each jaw is connected to a handle 30. The jaws 26, 28 open from one side only so that a pull from the opposite side tends to force the jaws tightly together.

The base 32 which supports the clamping jaws 26, 28 is located adjacent one end of the spaced rods 22, 24 and between the rods 22, 24 is a rectilinear movable ferrule pusher and sealer or ram, generally designated as E. The combined pusher and sealer is adapted to move the ferrule B along the outside of the casing A after the ferrule has been slipped over or pervaded through the free end of the casing. The clamp D holds one end of the casing so that movement of the ferrule in the direction of the presealed end of the casing forces the edible contents under pressure in that direction. When the ram E moves the ferrule so that the contents is firmly packed under pressure the operator seals the ferrule permanently to the casing, as shall be further described.

The ram or ferrule pusher and sealer E comprises a pair of arms 34, 36 which fit around the ferrule and are pivoted at 38. The lower ends 34A, 36A of the arms 34, 36 are attached to an air cylinder generally designated as F which has a cylinder housing 40 and a piston 42 therein. One end of the piston 42 is connected by a piston rod 44 to the arm 34A and the other arm 36A is connected to the cylinder housing. Movement of piston 42 by virtue of air pressure within the cylinder causes the arms 34, 36 to close.

In the top 20 is an elongated opening 45 which serves as a guide for the ram E when the ram jaws are closed. One end 45A is wider than the major length of the elongated opening 45 so that the jaws 34, 36 may open under the pressure of a spring 47 which tends to pull the legs 34A and 36A towards one another. The piston F tends to exert a pressure on the legs 34A, 36A opposite to that exerted by the spring 47.

A control valve, generally designated as G, is foot controlled by a foot lever 46, so that actuation of the foot lever 46, its foot rod 46A causes the valve G to open to admit air into the cylinder F thereby tightly clamping the jaws E around the ferrule.

A second cylinder, generally designated as H, is beneath the top 20 and is aligned to have a piston rod 48 which is securely fastened to the pivotal junction of the arms 34, 36. In other words, the piston rod 48 from the cylinder H is adapted to pull the jaws E parallel to the rods 22, 24. At the end of the stroke of the piston in the cylinder H the operator can press upon a handle 50 which has a plunger 52 that crimps the ferrule B about the casing A. The plunger 52 is guided through the opening 52A in the arm 34; and a spring 52B surrounding the plunger 52 tends to keep the plunger 52 out of the ferrule opening 53

A review of the operation of the process coupled with the machine will hereinafter be set forth.

A ham casing is stuffed with the cured ham from which the bone has been removed. One end of the casing is bound or tied with a string. A ferrule is slipped over the other end of the casing and the casing is carried to the machine which has been described. The open end of the casing is clamped to the jaws 26, 28 and then the second set of jaws or arms 34, 36 are located to grasp the ferrule. The operator places his foot on the foot lever 42 which actuates the control valve G so that air pressure is introduced in the cylinder F causing the jaws E to lock about the ferrule and, at the same time, compressed air is admitted into the cylinder H so that the cylinder draws the arms E away from the clamping jaws 26, 28. With the movement of the arms E and the ferrule B, the contents of the casing A is compressed and firmly packed within and along the longitudinal axis of the casing. At the end of the stroke the operator manually presses upon the handle 50 so that the pin 52 or plunger crimps the ferrule permanently to the casing.

After the crimping of the ferrule to the casing, which occurs at the end of the stroke, the operator turns the valve G so that compressed air enters into the side 49A of the piston 49 in the valve H to move the ram E towards the jaws D. The air pressure on the side 42A of the cylinder 40 is relieved, and air pressure is applied to the side 42B so that at the end of the return stroke the jaws 34, 36 open under the tension of the spring 47.

Hence, air pressure is applied to piston 49 on side 49A when the ram is brought into operation and air pressure is applied by the valve G when the ram E is to be returned.

The ham casing A is subsequently perforated with a series of fine openings to release any air trapped therein, and then the ham is placed within a suitable oven for smoking and cooking the ham.

With my invention, the contents of the casing is firmly compressed in a relatively rapid manner thereby effectively packaging edible foods in a small space. The sealing of the ferrule insures a very tight binder around the casing.

Although my invention has been described in considerable detail, such description is intended as being illustrative rather than limiting, since the invention may be variously embodied, and the scope of the invention is to be determined as claimed.

I claim as my invention:

1. A machine for pressure packing edible foods in a casing, a frame, a first pair of jaws adapted to hold one end of said casing, a second pair of jaws to hold a compressible metallic closure having a central opening therein through which said casing is pervaded, means to move said second pair of jaws with respect to said first pair of jaws under pressure whereby said closure and said casing moves with respect to one another, and means to compress said closure holding jaws about said closure whereby said closure and said casing are locked together, said first and second pair of jaws and said means being mounted upon said frame.

2. A machine for pressure packing edible foods within a casing for holding compressible edibles comprising a frame, a first pair of jaws adapted to hold one end of a casing and being mounted upon said frame, a metallic closure support mounted upon said frame and being adapted to support a metallic deformable closure having a passageway therein through which passageway said casing is pervaded, means mounted upon said frame to compress said edibles within said casing by moving said closure holding support and said first named pair of jaws apart with respect to one another under pressure, and means complementary to said closure support to clamp said closure tightly to said casing to keep said edible within said casing compressed.

3. A machine for pressure packing edible foods in a casing comprising a frame, a first pair of jaws adapted to grasp one end of said casing, a second pair of jaws to carry a closure, means to exert a pressure upon said casing along the longitudinal axis of the casing by relatively moving said first and second pair of jaws apart with respect to one another whereby said closure and said casing move with respect to one another, and to compress the said edible within said casing, means to compress said closure tightly to said casing to hold said edible under compression, and means whereby said first and second pair of jaws, said pressure exerting means and said compressing means are attached to said frame.

References Cited in the file of this patent

UNITED STATES PATENTS

| Number | Name | Date |
|---|---|---|
| 292,846 | Nye et al. | Feb. 5, 1884 |
| 373,778 | Koplin et al. | Nov. 22, 1887 |
| 1,359,135 | Wetmore | Nov. 16, 1920 |
| 1,688,499 | Jones | Oct. 23, 1928 |
| 2,251,859 | Vasarhelyi | Aug. 5, 1941 |
| 2,385,257 | Cavallito | Sept. 18, 1945 |
| 2,484,842 | McDonell | Oct. 18, 1949 |
| 2,492,063 | Frank et al. | Jan. 3, 1950 |